(12) United States Patent
Haji et al.

(10) Patent No.: US 7,315,561 B2
(45) Date of Patent: Jan. 1, 2008

(54) LASER GENERATOR

(75) Inventors: Nobuyuki Haji, Osaka (JP); Satoshi Eguchi, Osaka (JP); Atsuki Yamamoto, Osaka (JP); Nobuo Shinno, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 137 days.

(21) Appl. No.: 10/553,084

(22) PCT Filed: Nov. 16, 2004

(86) PCT No.: PCT/JP2004/017322

§ 371 (c)(1),
(2), (4) Date: Oct. 11, 2005

(87) PCT Pub. No.: WO2005/072904

PCT Pub. Date: Aug. 11, 2005

(65) Prior Publication Data

US 2006/0187996 A1    Aug. 24, 2006

(30) Foreign Application Priority Data

Jan. 29, 2004 (JP) .............................. 2004-021083

(51) Int. Cl.
*H01S 3/22* (2006.01)
(52) U.S. Cl. .......................................... 372/58; 372/55
(58) Field of Classification Search .................. 372/55, 372/58

See application file for complete search history.

(56) References Cited

U.S. PATENT DOCUMENTS

| 3,619,130 | A | * | 11/1971 | Ventriglio et al. ............ 95/115 |
| 4,528,436 | A |   | 7/1985  | Stol et al. |
| 5,811,753 | A | * | 9/1998  | Weick et al. .......... 219/121.78 |
| 6,331,693 | B1|   | 12/2001 | Smyth |
| 6,442,182 | B1|   | 8/2002  | Govorkov et al. |

FOREIGN PATENT DOCUMENTS

| DE | 101 17 488 A1 | 11/2002 |
| JP | 61-286085 | 12/1986 |
| JP | 03-060890 | 3/1991 |
| JP | 08-306993 | 11/1996 |

OTHER PUBLICATIONS

International Search Report corresponding to International Application No. PCT/JP2004/017322, dated Nov. 16, 2004.

* cited by examiner

*Primary Examiner*—Armando Rodriguez
(74) *Attorney, Agent, or Firm*—RatnerPrestia

(57) ABSTRACT

Flow laminators are attached to gas introducing parts installed in a laser generator preventing impurities from attaching to surfaces of a translucent mirror and a condensing lens. The flow laminators prevent airflow from producing a turbulent flow and air on the surface of the mirror and the lens are cleaned up, therewith reducing attachment of impurities further.

11 Claims, 3 Drawing Sheets

LASER GENERATOR

This application is a U.S. national phase application of PCT international application PCT/JP2004/017322.

TECHNICAL FIELD

The invention relates to a laser generator exciting laser medium, amplifying a caused light with light amplifying mirrors, and outputting a laser beam through one of the light amplifying mirrors as a translucent mirror.

BACKGROUND ART

FIG. 3 is a constitutional drawing of a conventional laser generator. In the laser generator, power supply 32 excites laser medium 31. Translucent mirror (hereinafter, called mirror) 34 and laser light amplifying mirror (hereinafter, mirror) 35 oscillate a caused light to be generated as laser beam 36. Mirror holder 33A and 33B hold mirrors 34 and 35, respectively. Mirror 34 is a translucent mirror allowing the laser beam to be output to outside. Mirror 34 is generally called an output mirror.

Laser beam 36 which is amplified by mirrors 34 and 35 and output through mirror 34 to outside passes through inside laser introducing duct (hereinafter, duct) 37 that protects the laser beam, shutter unit (hereinafter, shutter) 38, and light path duct 39 in this order. Then the light is reflected by reflecting mirror 40 and refracted by condensing lens (hereinafter, lens) 41 to be utilized as a beam for laser processing.

Shutter 38 is composed of reflect mirror 38A, actuator 38B driving reflect mirror 38A, and absorber 38C absorbing the laser light reflected by reflect mirror 38A. When laser beam 36 is not taken outside, actuator 38B drives reflect mirror 38A into a path of the laser light reflecting the light so as absorber 38C absorbs the laser beam reflected by reflect mirror 38A.

It is difficult to seal airtight components disposed outside mirror 34, i.e., duct 37, shutter 38 and light path duct 39 due to its structure. Consequently outside air containing oil, dust, iron powder and other impurities can flow into the components. If the air containing such impurities flows into the light path of the components and attaches to surfaces of the mirrors and lens 41, the laser light may burn the surfaces, which causes lowering power of the generator and damaging the optical components seriously.

In order to prevent such incidence, Japanese Patent Unexamined Publication Nos. S61-286085 and H3-60890 disclose a technology of sending filtered air or nitrogen gas into a vicinity of the optical components of the generator. That is, the conventional laser generator includes gas supply source 42 supplying air, filters 43A and 43B, and gas introducing parts 44A and 44B which are air exhaust nozzles. Filters 43A and 43B filter the air supplied by gas supply source 42, producing clean air. Gas introducing parts 44A and 44B send the clean air into a vicinity of mirror 34 and lens 41 and clean up air in the vicinity of the optical components. Instead of air, gas supply source 42 can supply nitrogen gas using a commercially available nitrogen cylinder that contains fewer impurities.

The air or the nitrogen gas that purges impurities at the vicinity of the mirror 34 and lens 41 includes far less impurities than ordinary air does. However in the ordinary method where gas introducing parts 44A and 44B forcefully blow out impurities, the blow out air is so called a turbulent flow having inconsistency in velocity and direction in the stream. Because of the reason, an eddy flow tends to occur inside duct 37 and inside light path duct 39 near lens 41, inefficiently expelling out contaminated air already existing in duct 37 and light path duct 39, therefore impurities concentration on the surface of the mirrors and lens 41 is not thoroughly reduced.

The effect of air flow that purges impurities (air purge effect) on the surface of mirror 34 can be examined by measuring oxygen concentration near the surface of mirror 34 by using nitrogen gas instead of air. It may be supposed that oxygen concentration on the surface of mirror 34 is reduced as the nitrogen flow increases, but actually the oxygen concentration does not fall down below a certain level. Even when nitrogen flow is increased for reducing the oxygen concentration below 100 ppm, the concentration is not in fact reduced lower than 0.2% (20,000 ppm) as long as the conventional air blowing method is employed. Thus, the method does not sufficiently protect components i.e. the mirrors and the lens that are very sensitive to dust, oil and other attached impurities, from performance deterioration caused by the impurities.

In recent years, a demand for a high power laser generator is increased and requirement for a higher energy density of the output light is augmented. However, the optical components are not yet sufficiently protected from being contaminated so achievement of the high power of the laser is obstructed.

SUMMARY OF THE INVENTION

A laser generator of the present invention has a laser generating part, a laser-introducing duct, a light path duct, and a condensing lens. The laser generating part includes a mirror outputting a laser light. The laser-introducing duct guides the laser beam output by the laser generating part. The light path duct is installed next to the laser-introducing duct and guides the laser beam. The condensing lens is placed at an exit of the light path duct and condenses the laser beam. The laser generator has at least one of a pair of first gas introducing part and a first flow laminator, and a pair of second gas introducing part and a second flow laminator. The first gas introducing part is placed near the mirror at the laser-introducing duct and introduces gas into the laser-introducing duct. The first flow laminator is placed at the first gas introducing part and regulating flow of the gas. The second gas introducing part is placed near the condensing lens at the light path duct and introduces the gas into the light path duct. The second flow laminator is placed at the second gas introducing part and regulates flow of the gas. According to the constitution, gas supplied to the laser-introducing duct and light path duct is laminated, effectively expelling out air containing impurities. Therewith, impurities on the surfaces of the output mirror and the condensing lens are reduced to a minimum level, providing the laser generator having a stable laser output and an enhanced reliability.

DETAILED DESCRIPTION OF PREFERRED EMBODIMENT

Figure 1:
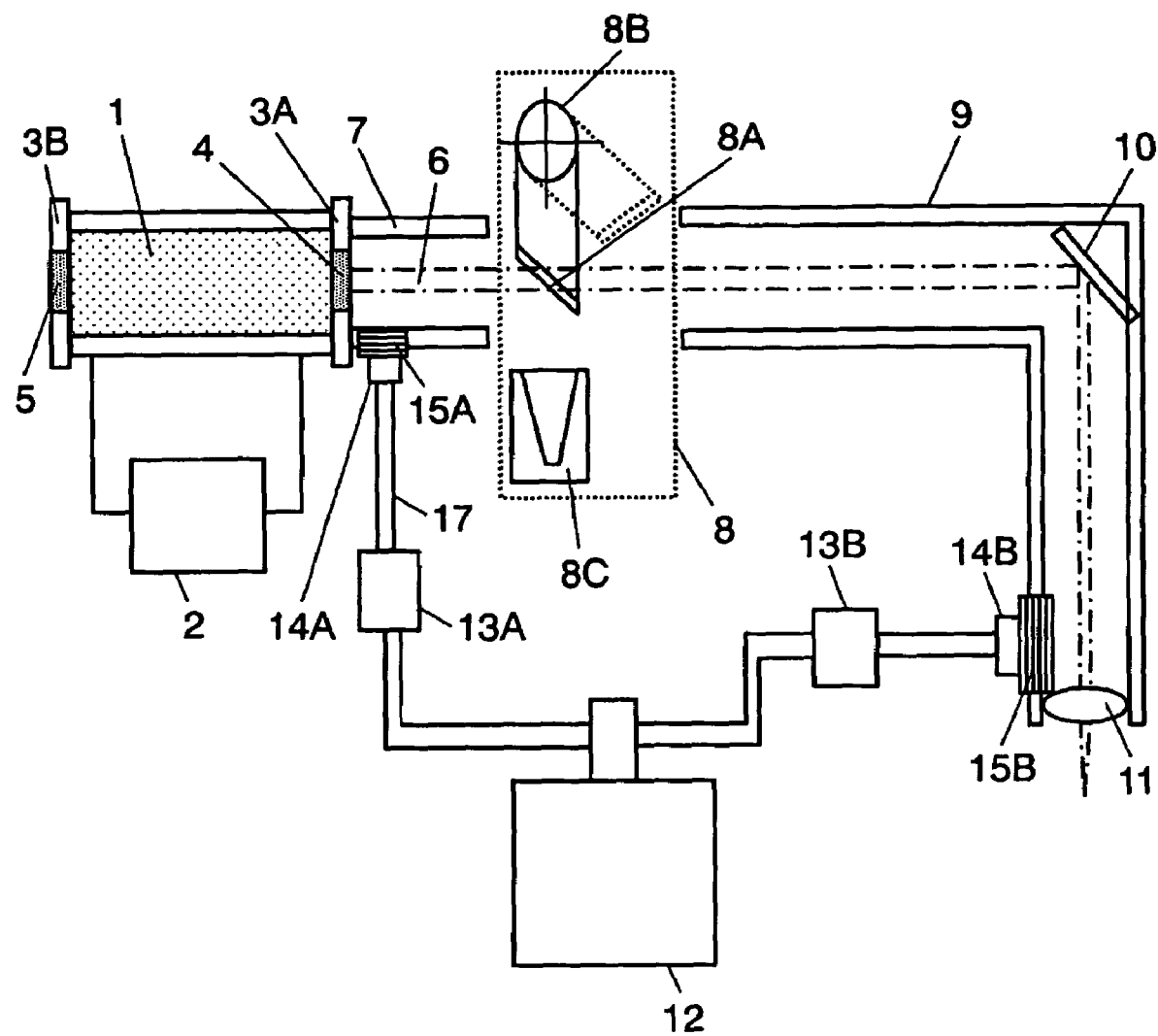
FIG. 1 is a constitutional drawing showing a structure of a laser generator in accordance with an exemplary embodiment of the present invention.

FIG. 1 is a constitutional drawing explaining a structure of a laser generator according to an exemplary embodiment of the present invention.

In the laser generator, power supply 2 excites laser medium 1. Translucent mirror (hereinafter, mirror) 4 and laser light amplifying mirror (hereinafter, mirror) 5 oscillate a caused light, generating laser beam 6. Mirror holder 3A and 3B hold mirror 4 and mirror 5, respectively. Because mirror 4 is a translucent mirror, the laser beam is allowed to be output to outside. FIG. 1 illustrates only one laser light amplifying mirror, but two or more of the mirrors can be installed. Laser medium 1, power supply 2, and mirrors 4 and 5 constitute a laser generating part.

Laser beam, amplified by mirrors 4 and 5 and output through mirror 4, passes through inside laser-introducing duct (hereinafter, duct) 7 that protects the laser beam. In other words, duct 7 directs the laser beam output by the laser generating part to outside. The laser beam then passes through inside shutter unit (hereinafter, shutter) 8 and light path duct 9 and the beam is reflected by reflecting-mirror 10 and condensed by condensing lens (hereinafter, lens) 11 to be used as a laser-processing beam. Lens 11 is placed at an exit of light path duct 9 that follows duct 7.

Shutter 8 is composed of reflect mirror 8A, actuator 8B driving reflect mirror 8A, and absorber 8C absorbing the laser beam reflected by reflect mirror 8A. When the laser beam needs not to be taken outside, actuator 8B drives reflect mirror 8A into a laser light path, so that the laser beam reflected by reflect-mirror 8A is absorbed by absorber 8C.

Gas supply source 12 is an air pump supplying air. Filters 13A and 13B are composed of electrically charged resin fiber made of polyurethane and polypropylene or of unwoven glass fiber, for example. Filters 13A and 13B filtrate the air to remove impurities and produce clean air. Gas introducing parts (hereinafter, introducing parts) 14A and 14B are exhaust nozzles of the clean air, and located near mirror 4 at duct 7 and lens 11 at light path duct 9. In other words, gas supply source 12 sends clean air through introducing parts 14A and 14B to vicinities of mirror 4 at duct 7 and lens 11 at light path duct 9, cleaning up air near the optical components. Instead of air, gas supply source 42 can supply nitrogen gas or an inert gas such as argon and helium using a commercially available nitrogen gas cylinder containing fewer impurities. In this case, filters 13A and 13B don't have to be disposed. Supply of air or gas is desirably controlled so that an inside pressure of duct 7 and light path duct 9 becomes higher than that of outside, preventing invasion of outside air.

Further in the exemplary embodiment of the invention, flow-laminators 15A and 15B are respectively installed inside introducing part 14A connected to duct 7 and inside introducing part 14B close to lens 11. Flow laminators 15A and 15B regulate the clean air supplied by gas supply source 12 through filters 13A and 13B, producing a laminar flow of the air.

Figure 2A:
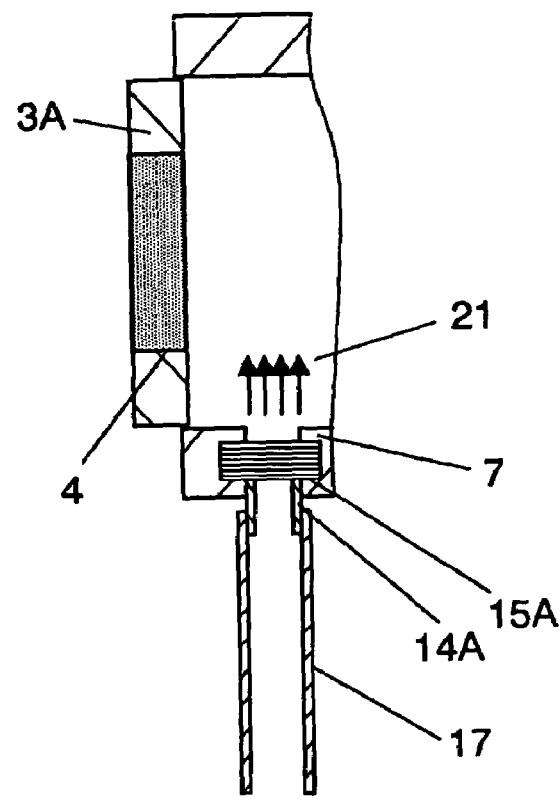
FIG. 2A is an enlarged sectional view of a main part of the laser generator shown in FIG. 1.

FIG. 2A is a sectional view showing details of duct 7 near mirror 4. Duct 7 is disposed with introducing part 14A, and introducing part 14A is connected to air hose 17 through flow laminator 15A in a mesh condition. Air 21 led through air hose 17 to introducing part 14A is supplied to inside duct 7 by passing through flow laminator 15A.

When flow laminator 15A is not attached, air 21 supplied through introducing part 14A produces a turbulent flow of air having an inconsistent velocity and direction. This tendency becomes more distinct as the airflow is increased. Flow laminator 15A is attached to a subsequent place of introducing part 14A where a round shape mesh filter is placed. Because the mesh filter is placed in the air path, the air blowing through the mesh filter appears out as a consistent stream. The phenomenon is theoretically identical water that is sprinkled by a watering pot.

One piece of the mesh filter can be placed; in this case the finer is the mesh the higher becomes the laminating effect. However, because producing a very fine mesh is difficult, a plurality of mesh filters can be used in layers achieving an identical effect. A round shape mesh filter is preferable but a polygon shape filter also works. For material of the mesh filter, a metal net can be used.

As described above, the laminar flow of air cleans the surface of mirror 4 and prevents impurities from attaching to mirror 4. FIG. 2A illustrates only duct 7. Because working principle is identical, explanation of a part of light path duct 9 near lens 11 is omitted. A device having a similar construction can be installed near mirror 10 too.

Figure 2B:
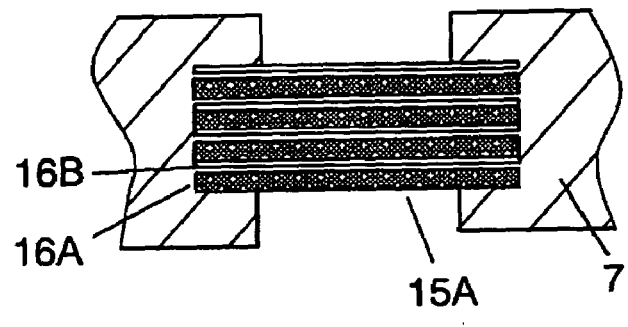
FIG. 2B is a conceptual sectional view of another flow laminator in the laser generator shown in FIG. 1.

FIG. 2B is a conceptual sectional view showing a more effective example of flow laminator 15A. In the example, four each of filters of 16A and 16B having different mesh sizes each other are alternately placed in layers. Number of the filters is not restrictive.

When filters having an identical mesh size are laminated, meshes are often aligned, spoiling the effect of using a plurality of meshes. On the other hand, when four each filters 16A and 16B having different mesh sizes are alternately laminated as shown in FIG. 2B, air inevitably flows through the different sizes of meshes winding its way, achieving a more efficient laminar flow of the air.

Figure 2C:
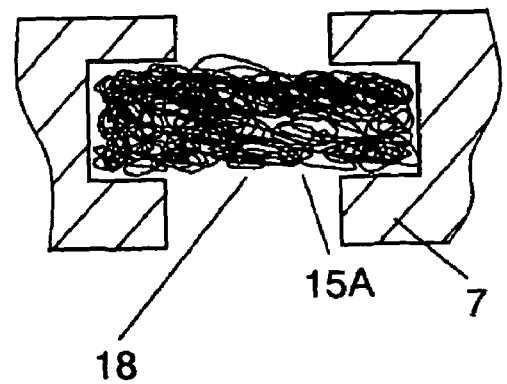
FIG. 2C is a conceptual sectional view of a still other flow laminator in accordance with the exemplary embodiment of the present invention.
Figure 3:
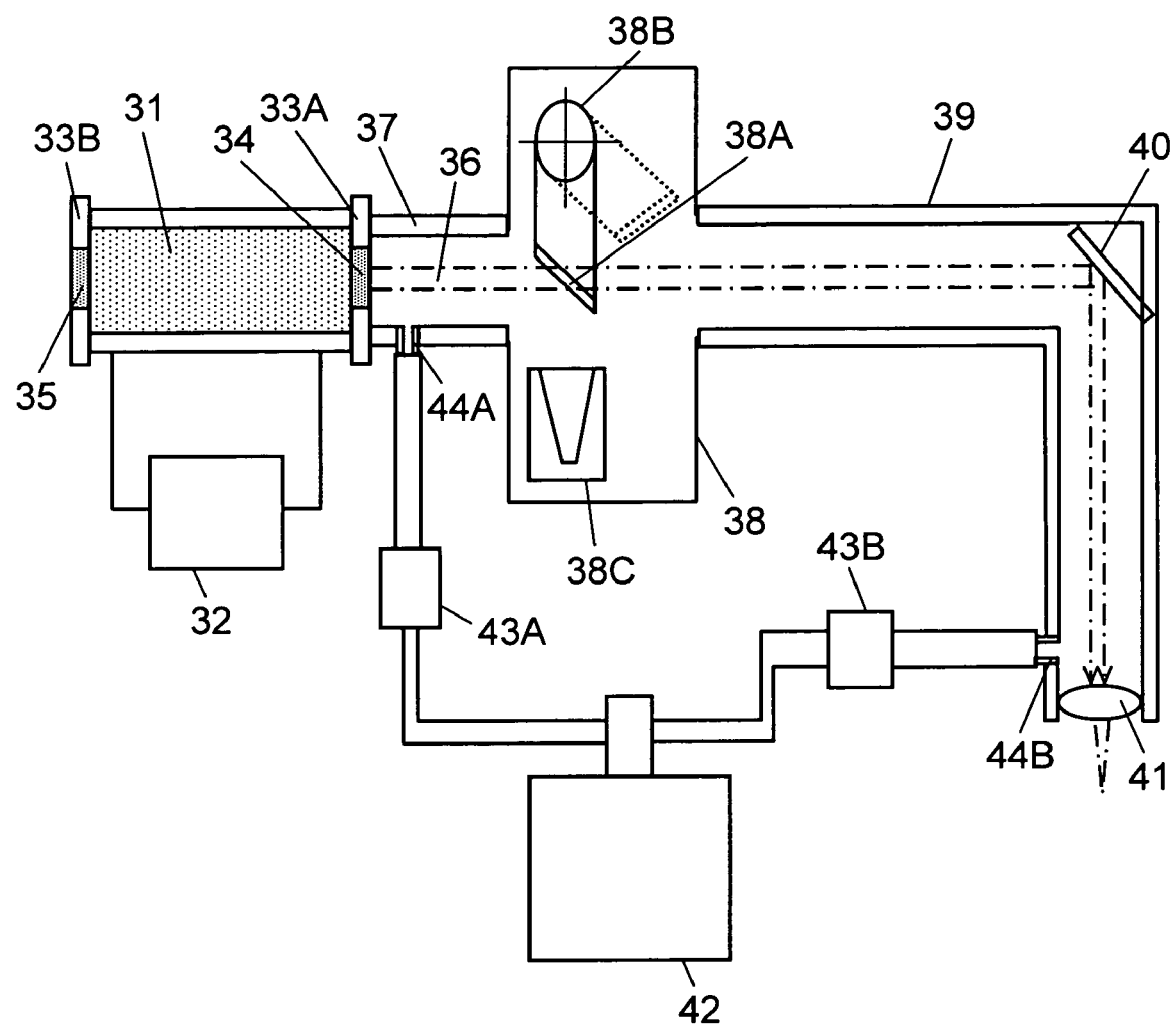
FIG. 3 is a constitutional drawing showing a structure of a conventional laser generator.

FIG. 2C shows a structure of still other type of flow laminator 15A. In the constitution, filter 18 of thin wire such as stainless steel made like a cotton ball is used in place of mesh filter 16A and 16B in FIG. 2B. Air stream is as well laminated with the structure.

By installing above described flow laminators 15A and 15B, impurities concentration in the air around the surfaces of mirror 4 and lens 11 is easily reduced down to 100 ppm or less.

The clean air usually is sent into duct 7 and light path duct 9 for getting rid of impurities during daytime when the laser generator is working. Yet, outside air including impurities may get into duct 7 and light path duct 9 during nighttime or holidays when the laser generator is not working, attaching to the surfaces of mirror 4 and lens 11. To keep the optical components clean, the clean air is sent even when the generator is not working as well as during nighttime, securing a higher efficiency.

In above description, a pair of introducing part 14A and flow laminator 15A and a pair of introducing part 14B and flow laminator 15B are both installed, but only one of the pairs can be installed to either one where the affect of impurities are more serious.

INDUSTRIAL APPLICABILITY

A laser generator of this invention supplies gas to an introducing duct and to a light path duct after laminating the gas, thereby effectively expels air including impurities to outside the generator. Therefore, an amount of impurities on surfaces of an output mirror and a condensing lens is reduced to a minimum level, providing an industrially useful laser generator having a stable output and a high reliability.

The invention claimed is:

1. A laser generator comprising:
   a laser generating part including a mirror outputting a laser beam,
   a laser-introducing duct guiding the laser beam output by the laser generating part,
   a light path duct installed next to the laser-introducing duct and guiding the laser beam,
   a condensing lens placed at an exit of the light path duct and condensing the laser beam, and
   at least one of
      a pair of (a) a first gas introducing part for introducing gas into the laser-introducing duct, and (b) a first flow laminator regulating a first flow of the gas so that the first flow of the gas is a laminar flow on the mirror, or
      a pair (a) second gas introducing part for introducing the gas into the light path duct, and (b) a second flow laminator regulating a second flow of the gas, so that the second flow of the gas is a laminar flow on the condensing lens.

2. The laser generator according to claim 1, wherein the at least one of the first or the second flow laminators includes a mesh filter.

3. The laser generator according to claim 2, wherein the mesh filter is one of a plurality of mesh filters, the at least one of the first and the second flow laminators is composed of the plurality of the mesh filters placed in layers.

4. The laser generator according to claim 3, wherein the plurality of the mesh filters including a first mesh filter and a second mesh filter having a different mesh size from the first mesh filter.

5. The laser generator according to claim 1, wherein the at least one of the first or the second flow laminator including a filter of thin wires made into a shape of a cotton ball.

6. The laser generator according to claim 1, wherein the gas is supplied both when the laser generator is working and not working.

7. The laser generator according to claim 1, wherein the gas is one of an inert gas and nitrogen.

8. The laser generator according to claim 1 further comprising;
   a gas supply source supplying air, and
   a filter filtering the air supplied by the gas supply source,
   wherein at least one of the first and the second gas introducing part uses the air filtered by the filter as the gas.

9. The laser gas generator according to claim 1, wherein at least one of pressure inside the laser-introducing duct and the light path duct is higher than pressure outside.

10. The laser generator according to claim 1, wherein the first gas introducing part is placed near the mirror at the laser-introducing duct and the first flow laminator is placed at the first gas introducing part.

11. The laser generator according to claim 1, wherein the second gas introducing part is placed near the condensing lens at the light path duct and the second flow laminator is placed at the second gas introducing part.

* * * * *